United States Patent [19]

Esch

[11] 4,352,300
[45] Oct. 5, 1982

[54] COMBINED LINEAR AND CIRCULAR DRIVE MECHANISM

[75] Inventor: Johannes H. L. H. Esch, Aalten, Netherlands

[73] Assignee: Vitafin N.V., Curacao, Netherlands Antilles

[21] Appl. No.: 180,004

[22] Filed: Aug. 21, 1980

[51] Int. Cl.$^3$ .................. F16H 27/02; F16H 29/02
[52] U.S. Cl. ........................... 74/89.15; 74/424.8 R
[58] Field of Search ........ 74/89.15, 424.8 R, 424.8 A, 74/424.8 C, 804, 805; 366/241, 287, 288, 289

[56] References Cited

U.S. PATENT DOCUMENTS

| | | | |
|---|---|---|---|
| 2,556,572 | 6/1951 | Brinkhurst | 74/424.8 A |
| 3,077,792 | 2/1963 | Kinderman | 74/570 |
| 3,698,258 | 10/1972 | Gartner | 74/424.8 R |
| 3,710,632 | 1/1973 | Tucker | 74/424.8 A |
| 3,733,914 | 5/1973 | Sheesley | 74/424.8 A |
| 3,756,092 | 9/1973 | Gartner | 74/424.8 A |
| 3,982,718 | 9/1976 | Folkenroth et al. | 248/425 |

FOREIGN PATENT DOCUMENTS

| | | | |
|---|---|---|---|
| 243223 | 2/1912 | Fed. Rep. of Germany | 74/424.8 R |
| 441427 | 8/1975 | U.S.S.R. | 74/424.8 A |

Primary Examiner—Lawrence J. Staab
Attorney, Agent, or Firm—Woodcock, Washburn, Kurtz, Mackiewicz & Norris

[57] ABSTRACT

A combined linear and circular drive mechanism for driving a spindle in an up or down direction and also in a circular path about an axis parallel to the spindle. The mechanism has a dual or compound nut which is driven to rotate in a fixed plane so as to drive a spindle threaded therethrough in an up or down direction. The dual nut mechanism has a pair of nut components having respective eccentrically positioned threaded openings, the openings being displaced from each other such that one of the nut components engages the threaded spindle to drive it in a first direction while it is being carried in a circle, and a second nut component engages the spindle to drive it in the reverse direction, also while the shaft is being rotated in a circle. The threaded portion of the spindle is bounded by unthreaded portions, such that when it is driven to an upper or lower limit by one of the nut components such nut component ceases to engage the spindle threading, whereupon when the nut drive is reversed the other nut component engages the threaded portion and drives the spindle in the other direction.

8 Claims, 4 Drawing Figures

A　　　　　　　　B　　　　　　　　C

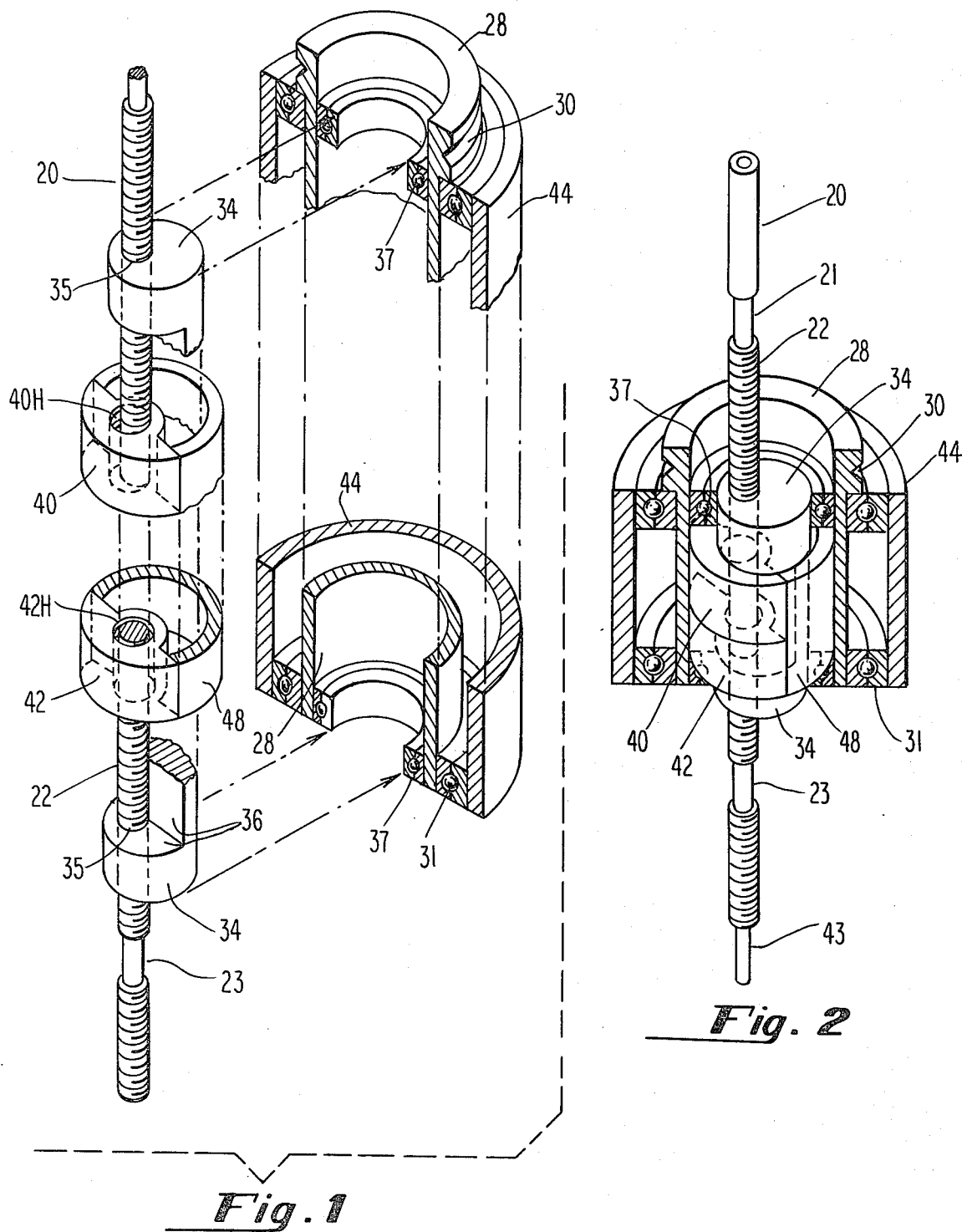

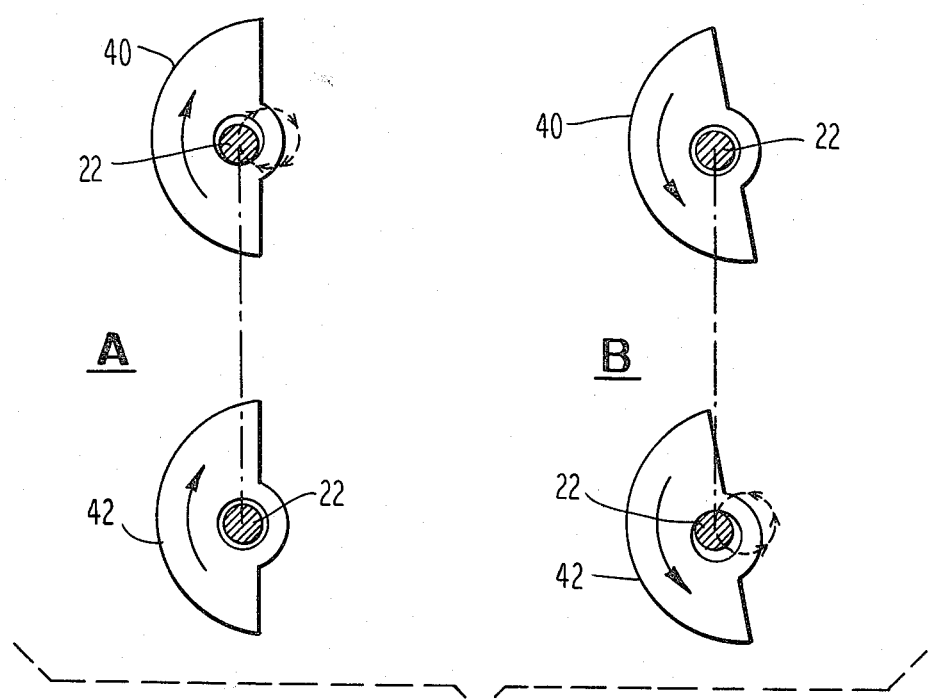
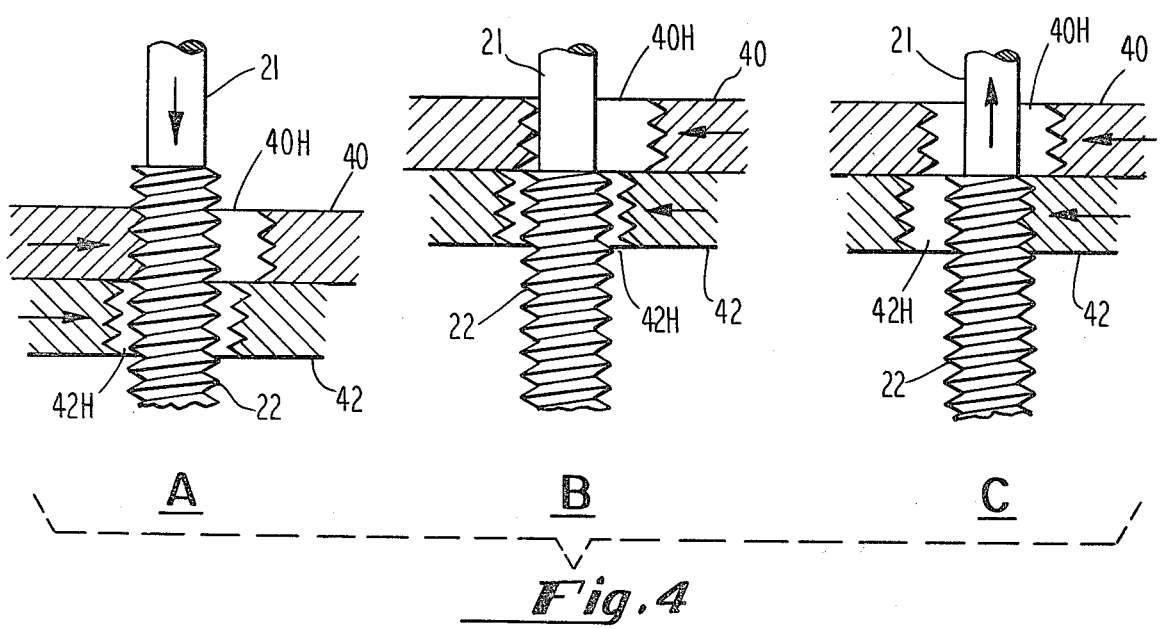

COMBINED LINEAR AND CIRCULAR DRIVE MECHANISM

BACKGROUND OF THE INVENTION

The subject invention relates to a reversible drive mechanism and, more particularly, a mechanism for driving a spindle in an up or down direction and also in a circular path about an axis parallel to the spindle. In the preferred embodiment, the device is used in a sample analysis instrument, wherein the spindle carries a pipette which is lowered into and raised from a well or like vessel holding a sample to be tested, and wherein the pipette provides a stirring action when it is lowered into the sample.

Reference is made to U.S. Pat. No. 4,224,278, entitled "An Apparatus for Performing Tests and Measurements on Liquid Samples". In that patent, an apparatus is disclosed for performing tests and measurements on various liquid samples, in particular sera. The apparatus employs three trays, each of which is provided with a plurality of storage receptacles, or wells. The first tray includes wells for samples to be tested. The second and third trays provide processing vessels, or wells. Situated above the trays are independently movable pipettes which are translatable in a horizontal plane above the trays to position the pipettes over particular wells. The pipettes are translatable in the vertical direction for adding or discharging sera sample, reagents, buffers, etc. into particular receptacles or wells. In order to accomplish this, a control must be provided for lowering the pipette just the proper distance so that it can release or take up sample, and then raise the pipette for movement to another position. At the same time, it is desirable to be able to control the pipette so that it provides a circular or stirring movement within the vessel, so as to stir the liquid contained therein. Thus, what is required is a dual purpose mechanism which provides both for the up and down movement of the pipette, and also the circular or stirring movement, with means to limit the range of vertical movement in each direction. While complicated controls of various designs can be achieved, by incorporating sophisticated electronic or electromechanical control, it is highly desirable to provide a very simple, inexpensive and reliable drive mechanism for controlling the pipette movement in the manner stated.

While the description provided will be oriented in terms of the illustrative pipette control as used in a sample analysis apparatus, it is to be understood that the invention can be adapted to any other application where a similar control is required, e.g. combined limited longitudinal movement and stirring about a longitudinal axis.

SUMMARY OF THE INVENTION

It is an object of this invention to provide a simple and reliable drive mechanism for driving a shaft in both a linear direction and in a circular manner displaced about a center axis. As used herein, circular means at a radius about a center point and not simply rotating about the axis of the shaft itself.

It is another object of this invention to provide a nut mechanism for driving a threaded bolt or the like, wherein the nut mechanism has separate respective threaded portions for engaging and driving the nut in opposite directions.

It is a further object of this invention to provide a drive mechanism for use in a sample analysis apparatus having one or more vessels containing liquid samples, and a spindle carrying a pipette which is lowered into and raised from the vessel so as to eject fluid into and draw fluid from the vessel, the drive mechanism controlling the limits on up and down movement of the pipette into and away from the vessel, and also causing the pipette to rotate in a circular stirring motion within the vessel.

The above objects are achieved by a simple nut-drive mechanism, having a dual or compound nut which is driven to rotate in a fixed plane so as to drive a spindle threaded therethrough in an up or down direction. The dual nut mechanism has a pair of nut components having respective eccentrically positioned threaded openings, the openings being displaced from each other such that one of the nut components engages the threaded spindle to drive it in a first direction while it is being carried in a circle, and a second nut component engages the spindle to drive it in the reverse direction, also while the shaft is being rotated in a circle. The threaded portion of the spindle is bounded by unthreaded portions, such that when it is driven to an upper or lower limit by one of the nut components such nut component ceases to engage the spindle threading, whereupon when the nut drive is reversed the other nut component engages the threaded portion and drives the spindle in the other direction.

BRIEF DESCRIPTION OF THE DRAWINGS

FIG. 1 is a cut-away exploded view of the components of the drive mechanism of this invention.

FIG. 2 is a cross-sectional view of the machanism of this invention.

FIG. 3A is a schematic diagram showing the relation of nuts to the spindle with the upper nut engaged and the spindle being driven down; FIG. 3B shows the lower nut engaged and the spindle being driven up.

FIGS. 4A, 4B and 4C illustrate the relation of the nuts and the spindle as it is driven down, reaches the lower limit, and is driven up again. FIGS. 4A–4C illustrate the view seen looking from the right in FIGS. 3A and 3B.

DESCRIPTION OF THE PREFERRED EMBODIMENT

Referring now to FIGS. 1 and 2, there are illustrated the components of the drive mechanism of this invention. The components which are shown separately, i.e., in an exploded manner in FIG. 1, are shown in FIG. 2 in the actual operational arrangement.

A spindle 20 is illustrated having a center threaded portion 22, an upper unthreaded portion 21 and a lower unthreaded portion 23. Unthreaded portions 21, 23 have a diameter which is the same as the base diameter of threaded portion 22. As is understood from the entire description which follows, unthreaded portion 21 limits the downward vertical movement of the spindle, as viewed in FIGS. 1 and 2, whereas lower unthreaded portion 23 limits the upward movement of the spindle. The spindle is carried in a spindle carrier 34, which carrier has a generally cylindrical outside surface, an eccentrically located longitudinal opening 35 adapted to carry spindle 20, and a center cut-out portion 36 as seen in FIG. 1. Spindle carrier 34 is carried by bearings 37 mounted within the inner cylindrical opening of bushing 28. Thus, except as restrained by the nut mechanism described hereinbelow, spindle carrier 34 can rotate relative to bushing 28 which surrounds it concentrically. Note that rotation of the spindle carrier produces a circular motion of spindle 20 due to the eccentric location of the opening 35. The spindle 20 is held from above and thus does not rotate about its own axis, but the spindle does traverse a circular path with respect to the center axis of bushing 28, which circular movement enables pipette 43 to stir sample when it is inserted into a vessel holding sample.

Still referring to FIGS. 1 and 2, a unique nut means is provided comprising upper nut 40 and lower nut 42. These two nuts are shown spread apart in FIG. 1, and are shown together in the assembled mechanism illustrated in FIG. 2. Nut 40 has an opening 40H which is internally threaded, and nut 42 has an opening 42H, also internally threaded. Openings 40H and 42H have diameters only slightly greater than the diameter of the threaded portion 22 of the spindle, such that the spindle can be centered within an opening 40H, 42H without engaging the threads thereof. Nuts 40, 42 are roughly half moon shaped, with the curvilinear portion of the outer nut wall having a radius corresponding to the radius of the inner wall of bushing 28. The two nut portions 40, 42 are aligned and registered with a nut spacer 48, such that when the two nuts are clamped against spacer 48, and in combination they provide an outer cylindrical wall adapted to be pressure fit against the inner wall of bushing 28, as seen in FIG. 2. Thus, rotation of bushing 28 causes rotation of nuts 40, 42.

An important additional feature of the nuts is that openings 40H, 42H are displaced slightly, as seen further in FIGS. 3 and 4. In other words, openings 40H, 42H as aligned do not provide a uniform opening of the combined nut mechanism. Rather, when one of the nut components 40, 42 engages the threaded spindle, the spindle is centrally located in the opening of the other nut component and thus is free of it.

Bushing 28 is mounted within a fixed housing 44, and rotatably supported by bearings 31. The top of bushing 28 carries a belt groove 30, by which the bushing can be driven by a belt connection with a suitable reversible DC motor, not shown. When bushing 28 is driven in a clockwise direction, which is the condition illustrated in FIG. 1, upper nut 40 engages the threaded spindle and forces it down, such that unthreaded portion 21 approaches the top of spindle carrier 34. During this movement, the spindle is free within opening 42H in lower nut 42. When unthreaded portion 21 reaches opening 40H, the internal threading of nut 40 no longer engages the spindle, such that while the spindle continues to circle in the same direction, there is no further downward movement of the spindle. In this condition, pipette 43 remains at a fixed vertical position, but continues to move in a circular manner about the center axis of bushing 28. If it is desired to withdraw the pipette, i.e., raise the spindle, the motor is reversed, driving the bushing in a counter clockwise direction. Since spindle carrier 34 is supported relative to bearing 28 by bearings 37, bushing 28 rotates incrementally relative to carrier 34 until the hole 42H of lower nut 42 engages the spindle threads, at which time nut 42 commences to drive the spindle in an upward direction. This drive can be continued until unthreaded portion 23 comes into registration with the threads of opening 42H, thus limiting the upward movement of the spindle.

The action of the unique drive mechanism of this invention is further to be understood in relation to FIGS. 3 and 4.

FIG. 3A shows schematically the relation of nuts 40 and 42 to the spindle 22 when the bushing is rotating so that the nuts are carried in a clockwise direction. In this situation, upper nut 40 engages spindle 22, driving the spindle downward. As seen, the spindle is centered in the hole 42H of lower nut 42, such that lower nut 42 is not engaging the spindle. In FIG. 3B, the direction of rotation of the bushing has been reversed, carrying both nuts 40, 42 in a counter clockwise direction. Upon reversal of the bushing, the nuts are carried an incremental angle relative to the spindle carrier 34, until the threads of nut 42 engage spindle 22. This incremental movement is illustrated in FIG. 3B by showing nuts 40, 42 rotated a small angle in the counter clockwise direction.

Referring to FIGS. 4A, 4B, 4C, the action of the nuts when the spindle reaches a limiting position is seen. As illustrated in FIG. A, the spindle is moving down, with nut 40 engaging the threads 22 of the spindle. In this situation, the spindle is substantially centered in the opening 42H of nut 42, such that nut 42 is disengaged from the spindle. As illustrated in FIG. B, unthreaded portion 21 has reached center opening 40H of nut 40, such that nut 40 no longer can drive the spindle downward. In this situation, the spindle continues to be driven in a circular path by the eccentric position of the opening in spindle carrier 34, but the spindle remains in a fixed vertical position. This is the case when the pipette has been lowered into the vessel and is at the designated height for injecting or withdrawing sample, and the pipette traverses a circular path to stir the fluid in the vessel. As illustrated in FIG. C, the bushing rotation has been reversed so that nut 42 engages the spindle threads 22, driving the spindle upward. Compared to FIG. B, the nuts have rotated incrementally relative to the spindle such that the threads of nut 42 engage the spindle while the spindle is substantially centered in the opening 40H of nut 40.

There has been illustrated a unique drive mechanism for driving a spindle, the drive mechanism having a pair of nuts with openings displaced slightly axially such that one nut drives the spindle in a first direction, and when the nut rotation is reversed the other nut drives the spindle in the reverse direction. By this arrangement, the spindle can be provided with unthreaded portions bounding the upper and lower ends of the threaded portion, whereby the axial or longitudinal movement of the spindle in each direction is limited by means is provided to return the spindle in the opposite direction by simply reversing the motor which rotates the drive mechanism. While the invention has been described to illustrate a preferred embodiment as reduced to practice, it is to be understood that it can be utilized in other applications within the scope of this invention.

I claim:

1. A drive mechanism for driving a spindle, said spindle having a threaded portion of a predetermined diameter and unthreaded portions bounding each side of said threaded portion, said mechanism comprising:
   (a) A generally cylindrical spindle carrier, having a longitudinal opening through which said spindle extends, said opening being eccentrically positioned in said carrier;

(b) A cylindrical bushing having a bushing opening, said spindle carrier being positioned concentrically within said bushing opening, and bearing means for movably bearing said spindle carrier within said bushing;

(c) Nut means for engaging said threaded portion of said spindle, said nut means having two nut components, each component having an internally threaded longitudinal opening, said spindle extending through each of said nut openings, said nut components being integrally fixed to and carried in said bushing opening, said nut component openings having a greater diameter than said spindle diameter and having respective different center axes such that when said spindle threaded portion engages the internal threaded opening of one of said nut components it is free of the internal opening of the other nut component; and (d) Whereby rotation of said bushing in a clockwise direction causes one of said nut components to drive said spindle in a first longitudinal direction and rotation in a counter clockwise direction causes the other of said nut components to drive said spindle in the reverse longitudinal direction, and said spindle is moved in a circular path about the center axis of said bushing while said bushing is rotated.

2. The drive mechanism as described in claim 1, wherein said nut component center axes are displaced relative to each other such when a first of said nut components is aligned with one of said unthreaded portions the other of said nut components is in position to engage said spindle threaded portion.

3. The drive mechanism as described in claim 2, comprising means for maintaining said nut components contiguous to each other.

4. The drive mechanism as described in claim 2, comprising means for maintaining said nut components displaced longitudinally from each other.

5. The drive mechanism as described in claim 3, comprising a fixed housing, and bearing means for supporting rotation of said bushing within said fixed housing.

6. The drive mechanism as described in claim 1, comprising a pipette carried by the bottom portion of said spindle.

7. An assembly comprising a longitudinally extending element and drive means for controllably driving said element in opposite longitudinal directions and for driving said element in a circular path about a longitudinal axis parallel to and offset from said longitudinal directions, characterized in that, said element has a threaded portion and unthreaded portions at the boundaries of said threaded portion; and said drive means comprises a cylindrical bushing having a center longitudinal axis along said longitudinal axis, nut means connected to and positioned within said bushing for engaging said threaded portion of said element, said nut means having two abutting nut sections each with an internally threaded hole, each of said nut holes being positioned at a respective different eccentric position relative to said bushing center axis, said spindle extending through said nut section holes, whereby when said bushing is rotated in a first direction, a first of said nut sections engages and drives said element in a first of said opposite longitudinal directions and when said bushing is rotated in a second opposite direction the second of said nut sections engages and drives said element in the opposite of said longitudinal directions, and when either of said nut portions is engaged with said element and drives said element in a given direction, one of said unthreaded portions limits the extent of longitudinal drive in said given direction.

8. An assembly for driving a threaded spindle or the like, said spindle having a threaded portion bounded by unthreaded portions, comprising first and second nut elements having threads complimentary to that of said threaded spindle, means for driving said spindle in a circular path about a longitudinal axis, and means for alternately engaging said spindle with said first nut element and for driving said spindle in a first longitudinal direction parallel to and offset from said axis, and for engaging said spindle or the like with said second nut element and driving said spindle in an opposite longitudinal direction parallel to and offset from said axis, whereby when one of said unthreaded portions reaches the one of said nut elements driving said spindle, said spindle is continuously driven in said circular path and is not driven in a longitudinal direction.

* * * * *

UNITED STATES PATENT AND TRADEMARK OFFICE
CERTIFICATE OF CORRECTION

PATENT NO. : 4,352,300
DATED : October 5, 1982
INVENTOR(S) : Johannes H. L. Hogen Esch It is certified that error appears in the above-identified patent and that said Letters Patent are hereby corrected as shown below:

Column 6, line 1, change "extending" to -- extended --.

Signed and Sealed this

Fourth Day of January 1983

[SEAL]

Attest:

Attesting Officer

GERALD J. MOSSINGHOFF
Commissioner of Patents and Trademarks